June 30, 1925.
P. O. PEDERSEN
ARC GENERATOR
Filed June 21, 1919
1,544,102
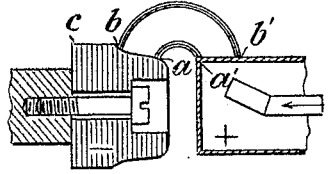
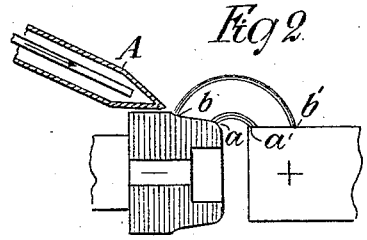
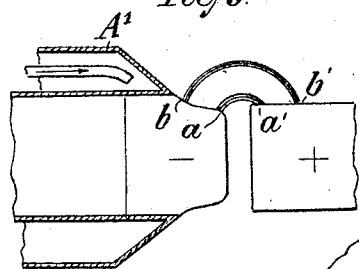
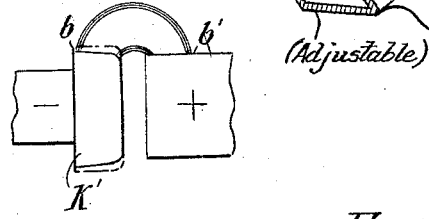
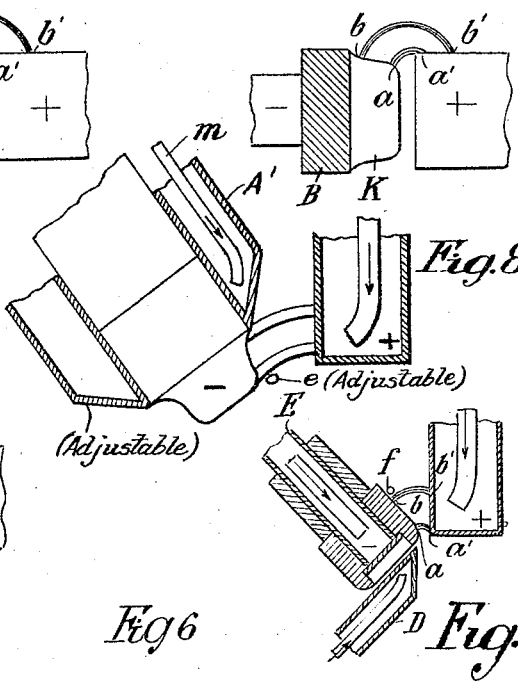
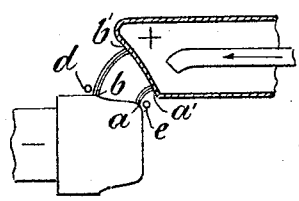
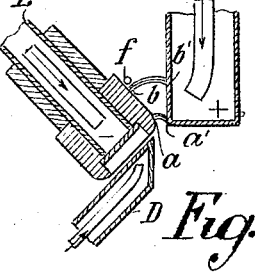
Inventor
Peder O. Pedersen
By
Rosenbaum Stockbridge Borst
Attorneys Patented June 30, 1925.

1,544,102

UNITED STATES PATENT OFFICE.

PEDER OLUF PEDERSEN, OF FREDERIKSBERG, NEAR COPENHAGEN, DENMARK, ASSIGNOR, BY MESNE ASSIGNMENTS, TO POULSEN WIRELESS CORPORATION, A CORPORATION OF ARIZONA.

ARC GENERATOR.

Application filed June 21, 1919. Serial No. 305,844.

*To all whom it may concern:*

Be it known that I, PEDER OLUF PEDERSEN, a subject of the King of Denmark, residing at Frederiksberg, near Copenhagen, Denmark, have invented new and useful Improvements in or Relating to Arc Generators; and I do hereby declare the following to be a full, clear, and exact description of the same.

This invention relates to arc-generators and the object thereof is to increase the constancy of the oscillations and the efficiency of arc-generators producing high frequency currents, and particularly to the effect that coupled circuits (transformation), when desired, may be used more economically than heretofore for instance in the case of the aerial having small capacity and great resistance.

As is well known, the magnetic field in the ordinary Poulsen-arc ought to be just strong enough to blow out the arc once in each period. The magnetic field being substantially weaker the arc will show a tendency periodically to travel too far out along the electrodes (away from the edges), in which case the efficiency of the arc will be reduced owing to the great arc voltage correspondingly to the great arc-length and the wave length of the produced oscillations will vary. Consequently the strength of the magnetic field should be such that it shall in due time be able to produce the necessary extinction voltage; but even in such cases where the magnetic field in previously known arrangements has been adjusted to the most favourable extinction voltage, the efficiency of the arc has been limited owing to the gradual increase of the arc resistance following the comparatively gradual rise of the extinction voltage.

In other words the object of the present invention is to reform the condition of starting and blowing-out of an arc while the arc-resistance is reduced to a favourable minimum during the intermediate burning-time. According to the invention this is obtained by providing the cathode with cooling or other means which will restrict the travelling outwards of the arc and regulate the temperature at the starting point for a properly high starting voltage. Furthermore according to this invention the electrodes are preferably so formed and arranged or formed or arranged relatively to one another that the increases in length and resistance of the arc during its travelling are restricted to the most favourable minimums.

Fig. 1 of the drawing shows for comparison the usually employed arrangement, whereas Figs. 2–8 illustrate six different embodiments of the invention.

In accordance with the heretofore commonly used arrangement, shown in Fig. 1, including carbon-cathode and water-cooled copper-anode the arc is drawn in the position $aa'$, and by the magnetic field driven to the position $bb'$, in which it is blown out.

Fig. 2 represents an embodiment of the new improvement, the cooling being achieved by water flowing through the copper-pipe A which latter bears against or is fixed right near the cathode. The position of the pipe A may be adjustable.

Fig. 3 shows another embodiment with the cathode on the whole circumference surrounded by a cooled metal-collar $A^1$.

Fig. 4 shows an embodiment in which the arc at the point $b$ travels from the proper cathode K to cooling back piece B, which is formed of a material which is a poor electrical conductor, such as a poor grade of carbon having a high resistance or of a metal having a high melting point. When now the arc during its travel along the cathode passes over the back piece B, the current through the arc will decrease owing to the higher resistance encountered in the back piece. This in turn causes a sudden drop of the arc temperature and consequently the arc is extinguished. The parts K and B may be formed either as an integral piece or they may be formed from two distinct parts.

In the embodiment, shown in Fig. 5, the extent of travel of the crater is limited by the length of the electrode $K^1$ which has a length affording the desired interval between starting and extinction of the arc. In this case will always be blown out at the hindmost edge $b$.

The embodiments of the invention illustrated in Figs. 4 and 5 are claimed specifically in a divisional application, Serial No. 677,965, filed December 1st, 1923, and entitled Arc converter.

Fig. 6 represents a fifth embodiment.

Here the electrodes are parallel and displaced relative to one another and the anode is provided with a surface such that the arc on its passage from *aa'* to *bb'* will not get the usual great increases of length and resistance, while the necessary high starting and extinction voltages are produced by exposing the particular points of the cathode at which the starting and extinction of the arc shall take place to a local cooling effected by currents of air or liquid through the blowpipes *d* and *e*. As blast may for instance be used hydrogen, coal-gas, alcohol, ether and the like. Several pipes, blowing from different directions may of course be employed. The pipes can be adjusted in their relative positions and relatively to the cathode in order that the points of starting and extinction may be displaced according to the requirements of the various circuits which may be connected to the arc.

The embodiment illustrated in Fig. 6 is claimed in another divisional application, Serial No. 677,966, filed December 1st, 1923, and entitled Arc converter.

Fig. 7 shows an embodiment where the same facts as sketched in Fig. 6 are achieved by letting the axes of the electrodes form an acute angle. The cooling at the starting point *a* is effected by a water-cooled metal pipe D, applied near to the cathode, while the cooling of *b* is done by a blowpipe *f*. To procure a quicker cooling of the crater path in order to prevent restarting in intermediate points the cathode is moreover placed on a water cooled tube E.

In Figure 8 a further modification of the invention is illustrated in which the cathode is cooled by the collar A' which is adjusted along the length of the cathode and is supplied with a cooling circulating liquid through a conduit *m*. A small blow pipe *e* may be disposed adjacent to the forward end of the cathode for supplying thereto a blast of cooling air or liquid in order to obtain local cooling of the cathode at that point. The anode may be cooled in the manner illustrated in connection with the embodiment illustrated in Figure 7. With this construction, the blow pipe *e* limits the travel of the arc in one direction, and the cooling chamber A' limits the travel of the arc in the opposite direction. As will be noted, the anode and cathode are disposed at an angle from one another in a manner similar to that shown in Figure 7.

Various combinations of the different improvements set forth and explained may of course be used.

Having thus fully described my invention, I claim as new and desire to secure by Letters Patent:

1. In an arc converter, a pair of electrodes, and means for restricting the travel of the arc along one of the electrodes, comprising means for cooling said electrode on a restricted place on the electrode corresponding to the limit of arc travel, said cooling being of such degree as to prevent the continuation of the arc at the cooled place.

2. In an arc converter, an anode, a cathode, means for cooling the anode, and means for restricting the travel of the arc, comprising means for cooling the cathode on a restricted place corresponding to the limit of arc travel, said cooling being of such degree as to prevent the continuation of the arc at the cooled place.

3. In an arc converter, a pair of electrodes, and means for restricting the travel of the arc along one of the electrodes, comprising a cooled metal member closely surrounding one of the electrodes, comprising a cooled metal member closely surrounding one of the electrodes, and exposing only as much of the said electrode as corresponds to the limit of arc travel, the degree of cooling of the member being such as to prevent the continuation of the arc beyond the exposed portion of the electrode.

4. In arc-generators, an anode, a cathode, and means for cooling the cathode at the point where the arc is to be extinguished.

5. In an arc converter, a pair of electrodes, and means for establishing the starting point of the arc on one of the electrodes, comprising means for cooling said electrode on a restricted place beyond which place the arc is to start, the cooling being of such degree as to prevent the arc from forming at said place.

6. In an arc converter, a pair of electrodes, and means for establishing the starting point of the arc on one of the electrodes, comprising a blow pipe arranged to blow a cooling blast against said electrode on a restricted place beyond which the arc is to start, the cooling being of such degree as to prevent the arc from forming at said place.

7. In an arc converter, a pair of electrodes, means for restricting the extent of travel of the arc along one of the electrodes, comprising means for cooling the electrode at a restricted place corresponding to the limit of arc travel, and means for cooling said electrode at another restricted place beyond which place the arc is to start, the degree of cooling at both places being such that the arc cannot form thereon.

8. In arc-generators, in combination, an anode, a cathode, cooling-means for cooling of the cathode at the point where the arc has to be extinguished and other cooling-means for cooling of the cathode at the point where the arc has to be drawn.

9. In an arc converter, a pair of electrodes between which the arc is formed, means for influencing the arc with the aid of a magnetic field, whereby the arc is caused to travel along the electrodes between the time of drawing and extinction, and means supplementary to the electrodes for limiting the travel of the arc along the electrodes.

10. In an arc converter, a pair of electrodes between which the arc is formed, means for magnetically influencing the arc whereby it may be caused to increase in length between the electrodes, and means supplementary to the electrodes for confining the lengthening of the arc below a definite limit.

11. In an arc converter, a pair of electrodes between which the arc is formed, means for magnetically influencing the arc so as to extinguish it, and means supplementary to the electrodes for determining the points of drawing and of extinction of the arc with respect to the electrodes.

12. In an arc converter, a pair of electrodes between which the arc is formed, means for magnetically influencing the arc whereby it is caused to travel along the arc electrodes, and means supplementary to the electrodes for limiting the outward travel of the arc.

13. In an arc converter, a pair of electrodes between which the arc is formed, means for magnetically influencing the arc whereby it is caused to travel along the arc electrodes, and means supplementary to the electrodes for ensuring that the arc will have a definite length between the electrodes at the time it is drawn.

In testimony whereof I have affixed my signature in presence of two witnesses.

PEDER OLUF PEDERSEN.

Witnesses:
  J. P. CHRISTENSEN,
  KARL WERNER.